United States Patent Office 3,317,509

Patented May 2, 1967

3,317,509

PROCESS FOR THE PRODUCTION OF METHYL N-ACYL - 2,3,4,7 - TETRA - O - ACYL - β - THIOLINCOSAMINIDES

Brian Bannister, Kalamazoo, Mich., assignor to The Upjohn Company, Kalamazoo, Mich., a corporation of Delaware No Drawing. Filed June 15, 1964, Ser. No. 375,299
3 Claims. (Cl. 260—210)

This invention relates to a chemical process and is more particularly concerned with a novel process for the preparation of methyl N-acyl-2,3,4,7-tetra-O-acyl-β-thiolincosaminides [methyl 6-acylamino-2,3,4,7-tetra-O-acyl - 6,8 - dideoxy - 1 - thio - D-erythro-β-D-galacto-octopyranosides] (III).

The novel process for the production of methyl N-acyl-2,3,4,7-tetra-O-acyl-β-thiolincosaminides can be illustratively represented in the following manner:

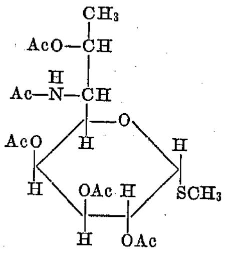

(I)

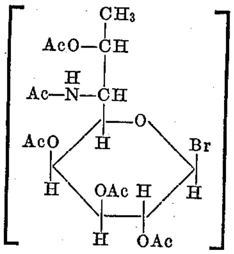

(II)

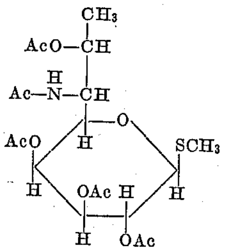

(III)

wherein Ac is the acyl radical of a hydrocarbon carboxylic acid containing from 2 to 12 carbon atoms, inclusive.

The process of the present invention comprises: treating methyl N-acyl-2,3,4,7-tetra-O-acyl-α-thiolincosaminide (I) with bromine in an inert organic solvent, e.g. chloroform, methylene chloride, dioxane, tetrahydrofuran, benzene, and the like to produce N-acyl-2,3,4,7-tetra-O-acyl-1β-bromo-1-deoxylincosamine (II); treating compound II in an organic solvent with a metal methylmercaptide to give methyl N-acyl-2,3,4,7-tetra-O-acyl-β-thiolincosaminide.

The methyl N - acyl - 2,3,4,7-tetra-O-acyl-β-thiolincosaminides are important intermediate for the production of antifungal reagents. For example, the methyl N-acyl - 2,3,4,7 - tetra-O-acyl-β-thiolincosaminide (III) can be treated with ammonia dissolved in methanol to give the corresponding methyl N-acyl-β-thiolincosaminide, which on treatment with acetone in sulfuric acid forms a methyl 3,4 - O - isopropylidene - N - acyl-β-thiolincosaminide. This compound can be reductively desulfurized with Raney nickel to an N-acyl-3,4-O-isopropylidene-1-deoxylincosamine, which is then converted with methyl iodide and a suitable strong base to an N-acyl-3,4-O-isopropylidene-7-O-methyl-1-deoxylincosamine (N-acyl - 3,4-O-isopropylidene-7-O-methyl-1,5-anhydrolincosaminol), which is active against fungi, for example *Trichophyton rubrum* and *Pseudomonas fluoroescenes.*

Moreover, the product obtained from a methyl N-acyl - 2,3,4,7 - tetra - O-acyl-β-thiolincosaminide (III) by treatment with ammonia in methanol, namely a methyl N-acyl-β-thiolincosaminide, can be reacted with a polyisocyanate to form urethanes and ureas and can be used to modify polyurethane resins. For example, these compounds can be reacted with an excess of toluene di-isocyanate to form prepolymers which can be reacted with polyol ethers and polyol esters commonly used to form polyurethanes; alternatively these compounds can be mixed with polyol compounds and the mixture then reacted with toluene di-isocyanate. The methyl N-acyl-β-thiolincosaminides can furthermore be reacted with ethylene oxide, propylene oxide and other alkylene oxides to form methyl polyoxyalkylene - N - acyl-β-thiolincosaminides, which can be reacted with toluene di-isocyanate to form polyurethanes. Methyl N - acyl - β - thiolincosaminides are useful for producing rigid polyurethane foams. Methyl β-thiolincosaminide, obtained by hydrazinolysis of methyl N-acyl-β-thiolincosaminide, can also condense with formaldehyde, especially when the thiocyanic acid addition salts are employed to form polymers according to U.S. Patents 2,425,320 and 2,606,155, which are useful as pickling inhibitors.

In carrying out the process of the present invention, a methyl N-acyl-2,3,4,7-tetra-O-acyl-α-thiolincosaminide is reacted with bromide in an inert organic solvent, generally at room temperature. As solvents, methylene chloride, chloroform, ethylene chloride, carbon tetrachloride, benzene, or the like, can be used. The ratio of bromine to the methyl N-acyl-2,3,4,7-tetra-O-acyl-α-thiolincosaminide is about 2 moles of bromine per mole of the amino sugar. In the preferred embodiment of this invention the selected methyl N-acyl-2,3,4,7-tetra-O-acyl-α-thiolincosaminide is treated with a bromine solution in a chlorinated hydrocarbon, e.g., methylene chloride, chloroform, which is added over a period of about 5 minutes to about 2 hours. The reaction temperature can vary between 0 and 50° C., with room temperature being preferred.

At the termination of the reaction most of the solvent is removed by evaporation, preferably in vacuo, and the residue, an N - acyl - 2,3,4,7-tetra-O-acyl-1β-bromo-1-deoxylincosamine (II) is used for the next step without further purification.

The crude N-acyl-2,3,4,7-tetra-O-acyl-1β-bromo-1-deoxylincosamine is redissolved in an organic solvent such as methanol and thereto is added a metal methylmercaptide, for example sodium, potassium, magnesium, calcium, mercury, silver, or thallium methylmercaptide or the like. In the preferred embodiment of this invention the reaction is carried out at low temperatures, between −10 and +10° C., by adding the bromo compound (II) dropwise to the solution of the metal methylmercaptide, preferably sodium or potassium methylmercaptide. After the addition is completed, the temperature is allowed to rise to room temperature. The addition is carried out between 5 minutes and 30 minutes, but longer times of addition can be used. At the termination of the reaction, the material is isolated by evaporating the solvent, and the crude residue is generally reacylated with an acid anhydride having the same acyl group as the starting methyl N-acyl-2,3,4,7-tetra-O-acyl-α-thiolincosaminide. After the acylation is completed at room temperature, the methyl N-acyl-2,3,4,7-tetra-O-acyl-β-thiolincosaminide is recovered from the reaction mixture by conventional methods, such as by extraction with an organic solvent, and is purified in conventional manner by evaporating the extract and crystallizing the product as shown in detail in the examples.

The following examples are illustrative of the process and products of the present invention but are not to be construed as limiting.

EXAMPLE 1.—METHYL N-ACETYL-2,3,4,7-TETRA-O-ACETYL-β-THIOLINCOSAMINIDE

A. *Methyl α-thiolincosaminide*

A solution of 4 g. of lincomycin [U.S. Patent 3,086,-912] in 20 ml. of hydrazine hydrate (98–100%) was refluxed for 21 hours; excess hydrazine hydrate was then removed in vacuo under nitrogen at steam bath temperature. The residue, a pasty mass of crystals, was cooled, acetonitrile was added, and the mixture was stirred until the crystals were suspended. The crystals were collected and washed with acetonitrile and with ether. The yield of white, crystalline methyl α-thiolincosaminide after drying in vacuo at room temperature was 2.1 g. (84%). Recrystallization was accomplished by dissolving the methyl α-thiolincosaminide in hot dimethylformamide and adding an equal volume of ethylene glycol dimethyl ether.

Methyl α-thiolincosaminide has a melting point of 225–228° C., an optical rotation of $[\alpha]_D^{25}$ +276° (c., 768, water), and a pKa′ of 7.45.

*Analysis.*—Calcd. for $C_9H_{19}NO_5S$: C, 42.7; H, 7.56; N, 5.53; S, 12.66. Found: C, 42.6; H, 7.49; N, 5.75; S, 12.38.

B. *Methyl N-acetyl-2,3,4,7-tetra-O-acetyl-α-thiolincosaminide (I, Ac=acetyl)*

To a slurry of 1 g. of methyl α-thiolincosaminide in 5 ml. of pyridine was added 5 ml. of acetic anhydride. The mixture was warmed until the methyl α-thiolincosaminide dissolved. After standing at room temperature for ½ hour, the solution was warmed on a steam bath for 15 minutes and then poured into 50 ml. of water. Upon cooling and scratching, crystals resulted which were collected and washed with cold water. After drying in vacuo the yield of methyl pentaacetyl-α-thiolincosaminide was 950 mg. Recrystallization from hot water gave pure methyl pentaacetyl - α - thiolingcosaminide (methyl N-acetyl-2,3,4,7-tetra-O-acetyl-α-thiolincosaminide) having a double melting point, 211–213° C. and 218–220° C. and rotation of $[\alpha]_D^{25}$ +224° (c., 0.708, methylene chloride).

*Analysis.*—Calcd. for $C_{19}H_{29}NO_{10}S$: C, 49.2; H, 6.3; N, 3.1; S, 6.9. Found: C, 48.71; H, 6.52; N, 3.14; S, 6.77.

C. *N-Acetyl-2,3,4,7-tetra-O-acetyl-1-β-bromo-1-deoxylincosamine*

A solution of 1.4 g. (0.45 ml.) of bromine in 100 ml. of methylene chloride was added during 40 minutes to a magnetically stirred solution of methyl N-acetyl-2,3,4,7-tetra-O-acetyl-α-thiolincosaminide (2 g.) in 200 ml. of methylene chloride at room temperature. At first the bromine color disappeared immediately, then the reaction mixture became progressively more orange. After stirring for an additional 30 minutes at room temperature (about 25° C.), the solvent was removed by evaporation in a rotating evaporator at 30° C. and 15 mm. Hg pressure. A syrupy residue was obtained which was redissolved in 100 ml. of methylene chloride, and the solvent was removed again as before, leaving a residue of N-acetyl-2,3,4,7-tetra-O-acetyl-1β-bromo - 1 - deoxylincosamine.

D. *Methyl N-acetyl-2,3,4,7-O-acetyl-β-thiolincosaminide*

The thus-obtained residue (from C) was dissolved in 50 ml. of methanol and added dropwise to a stirred methanolic solution of potassium methylmercaptide which had been prepared by dissolving 1.7 g. of potassium in 100 ml. of methanol and adding thereto at 0° C. 12 ml. of methanethiol.

The thus-obtained reaction mixture was allowed to stand overnight at room temperature (about 22–25° C.) and was then taken to dryness on a rotatory evaporator at 30° C. and 15 mm. Hg pressure. An amorphous solid was obtained which was reacetylated by warming in an oil bath at 110° C. for 2 hours with 20 ml. of acetic anhydride and 2 g. of anhydrous sodium acetate. The dark solution was cooled, poured onto ice, and extracted thoroughly with chloroform. The extracts were washed with saturated aqueous sodium bicarbonate and with water and dried over anhydrous sodium sulfate, and the solvent was removed at 40° C. and 15 mm. Hg pressure. A solution of the residue in hot ethyl acetate was diluted to turbidity with Skellysolve B and refrigerated, and the thus-obtained crystals were collected by filtration; 650 mg. of methyl N-acetyl-2,3,4,7-tetra-O-acetyl-β-thiolincosaminide of melting point 273–275° C. was obtained.

In the manner given in Example 1–D, instead of potassium methylmercaptide, potassium ethylmercaptide, propylmercaptide, butylmercaptide and the like may be employed, which results in the production of other alkyl N - acetyl - 2,3,4,7 - tetra - O - acetyl - β - thiolincosaminides, e.g. ethyl, propyl, butyl, or the like N-acetyl-2,3,4,7-tetra-O-acetyl-β-thiolincosaminide.

*Example 2.*—METHYL N-PROPIONYL-2,3,4,7-TETRA-O-PROPIONYL-β-THIOLINCOSAMINIDE In the manner given in Example 1–B, methyl α-thiolincosaminide was reacted in pyridine solution with propionic anhydride to give methyl N-propionyl-2,3,4,7-tetra-O-propionyl-α-thiolincosaminide.

In the manner given in Example 1–C, methyl N-propionyl 1,2,3,4,7 - tetra - O - propionyl - α - thiolincosaminide was reacted in methylene chloride solution with bromine to give N-propionyl-2,3,4,7-tetra-O-proprionyl-1β-bromo-1-deoxylincosamine.

In the manner given in Example 1–D, N-propionyl-2,3,4,7 - tetra - O - propionyl - 1β - bromo - 1 - deoxylincosamine was treated with potassium methylmercaptide in methanol solution to give methyl N - propionyl - 2,3,4,7-tetra-O-propionyl-β-thiolincosaminide.

*Example 3.*—METHYL N-VALERYL-2,3,4,7-TETRA-O-VALERYL-β-THIOLINCOSAMINIDE

In the manner given in Example 1–B, methyl α-thiolincosaminide was treated with valeric anhydride in pyridine solution to give methyl penta-valeryl-α-thiolincosaminide, which upon treatment with bromine in chloroform solution (under conditions as in Example 1–C) gave N-valeryl - 2,3,4,7 - tetra - O - valeryl - 1β - bromo - 1-deoxylincosamine.

An ethanol solution of methyl N - valeryl - 2,3,4,7-tetra- O - valeryl - 1α - bromo - 1 - deoxylincosamine was added dropwise to an ethanolic solution of sodium methylmercaptide (under conditions as in Example 1–D) to give methyl N 1 valeryl - 2,3,4,7 - tetra - O - valeryl - β - thiolincosaminide.

*Example 4.*—N-PHENYLACETYL-2,3,4,7-TETRA-O-PHENYLACETYL-β-THIOLINCOSAMINIDE

In the manner given in Example 1–B, methyl α-thiolincosaminide was reacted with phenylacetic anhydride in pyridine to give methyl N - phenylacetyl - 2,3,4,7 - tetra-O-phenylacetyl-α-thiolincosaminide.

Methyl N - phenylacetyl - 2,3,4,7 - tetra - O - phenylacetyl - α - thiolincosaminide was treated with bromine in methylene chloride, as in Example 1–C, to give N-phenylacetyl - 2,3,4,7 - tetra - O - phenylacetyl - 1β-bromo-1-deoxylincosamine.

N - phenylacetyl - 2,3,4,7 - tetra - O - phenylacetyl - 1β-bromo - 1 - deoxylincosamine was treated as in Example 1–D with potassium methylmercaptide in methanol solution to give methyl N - phenylacetyl - 2,3,4,7 - tetra - O-phenylacetyl-β-thiolincosaminide.

In the manner given in Example 1–A through 1–D, other methyl - N - acyl - 2,3,4,7 - tetra - O - acyl - β-thiolincosaminides can be prepared by reacting methyl α-thiolincosaminide with an acid anhydride to give the corresponding methyl pentaacyl - α - thiolincosaminide; treating this methyl pentaacyl - α - thiolincosaminide with bromine to obtain the corresponding N - acyl - 2,3,4,7-tetra - O - acyl - 1β - bromo - 1 - deoxylincosamine and treating this compound with a metal methylmercaptide to give the corresponding methyl N - acyl - 2,3,4,7 - tetra- O - acyl - β - thiolincosaminide. Representative methyl N - acyl - 2,3,4,7 - tetra - O - acyl - β - thiolincosaminides thus obtained include:

methyl N-butyryl-2,3,4,7-tetra-O-butyryl-β-thiolincosaminide,
methyl N-isobutyryl-2,3,4,7-tetra-O-isobutyryl-β-thiolincosaminide,
methyl N-isovaleryl-2,3,4,7-tetra-O-isovaleryl-β-thiolincosaminide,
methyl N-hexanoyl-2,3,4,7-tetra-O-hexanol-β-thiolincosaminide,
methyl N-heptanoyl-2,3,4,7-tetra-O-heptanoyl-β-thiolincosaminide,
methyl N-octanoyl-2,3,4,7-tetra-O-octanoyl-β-thiolincosaminide,
methyl N-nonanoyl-2,3,4,7-tetra-O-nonanoyl-β-thiolincosaminide,
methyl N-decanoyl-2,3,4,7-tetra-O-decanoyl-β-thiolincosaminide,
methyl N-undecanoyl-2,3,4,7-tetra-O-undecanoyl-β-thiolincosaminide,
methyl N-lauryl-2,3,4,7-tetra-O-lauryl-β-thiolincosaminide,
methyl N-benzoyl-2,3,4,7-tetra-O-benzoyl-β-thiolincosaminide,
methyl N-(3-phenylpropionyl)-2,3,4,7-tetra-O-3-(phenylpropionyl)-β-thiolincosaminide,
methyl N-cyclopentanepropionyl-2,3,4,7-tetra-O-cyclopentanepropionyl-β-thiolincosaminide,
and the like.

Similarly, mixed acylates of methyl β-thiolincosaminides can be prepared by acylating methyl α-thiolincosaminide in a stepwise manner rather than by the method shown in Example 1–B. For this purpose methyl α-thiolincosaminide is reacted in methanol with a limited amount of an acid anhydride at low temperature, e.g. 50° C. to give the methyl N-acyl-α-thiolincosaminide. The methyl N-acyl-α-thiolincosaminide is then treated with a different acid anhydride or acyl halide in pyridine at room temperature to give a methyl N - acyl - 2,3,4,7 - tetra - O-acyl - α - thiolincosaminide in which the acyl groups on the amino nitrogen and on the oxygen are different. Subjecting this material to the process steps shown in Examples 1–C and 1–D, methyl N - acyl - 2,3,4,7 - tetra-O - acyl - β - thiolincosaminides are obtained in which the acyl groups on the nitrogen and on the oxygen differ from each other. Representative compounds of this type include:

methyl N-acetyl-2,3,4,7-tetra-O-propionyl-β-thiolincosaminide,
methyl N-propionyl-2,3,4,7-tetra-O-valeryl-β-thiolincosaminide,
methyl N-butyryl-2,3,4,7-tetra-O-hexanoyl-β-thiolincosaminide,
methyl N-valeryl-2,3,4,7-tetra-O-acetyl-β-thiolincosaminide,
methyl N-benzoyl-2,3,4,7-tetra-O-acetyl-β-thiolincosaminide,
methyl N-lauryl-2,3,4,7-tetra-O-acetyl-β-thiolincosaminide,
methyl N-(3-phenylpropionyl)-2,3,4,7-tetra-O-propionyl-β-thiolincosaminide,
methyl N-phenylacetyl-2,3,4,7-tetra-O-benzoyl-β-thiolincosaminide, and the like.

I claim:

1. A process for the production of a methyl N-acyl-2,3,4,7 - tetra - O - acyl - β - thiolincosaminide having the following formula:

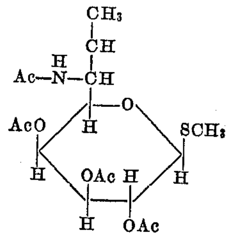

wherein Ac is the acyl group of a hydrocarbon carboxylic acid containing from 2 to 12 carbon atoms, which comprises: treating an N - acyl - 2,3,4,7 - tetra - O - acyl-α-thiolincosaminide of the formula

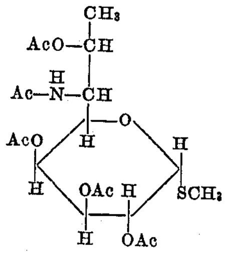

wherein Ac is defined as above, with bromine to obtain an N - acyl - 2,3,4,7 - tetra - O - acyl - 1β - bromo - 1-deoxylincosamine and treating this compound with a metal methylmercaptide to obtain a methyl N-acyl-2,3,4,7-tetra-O-acyl-β-thiolincosaminide.

2. The process of claim 1 wherein the metal methylmercaptide is potassium methylmercaptide.

3. A process for the production of methyl N-acetyl-2,3,4,7 - tetra - O - acetyl - β - thiolincosaminide which comprises: treating methyl N-acetyl-2,3,4,7-tetra-O-acetyl - α - thiolincosaminide with bromine to produce N - acetyl - 2,3,4,7 - tetra - O - acetyl - 1β - bromo - 1-deoxylincosamine and treating this compound with potassium methylmercaptide to give methyl N-acetyl-2,3,4,7-tetra-O-acetyl-β-thiolincosaminide.

References Cited by the Examiner

Hutson: "Chem. and Industry," No. 18, May 1964, pp. 750–751.
Ness et al.: "Jour. Amer. Chem. Soc.," vol. 72, May 1950, pp. 2200–2205.
Reeves et al.: "Jour. Amer. Chem. Soc.," vol. 76, 1954, pp. 2219–2221.

LEWIS GOTTS, *Primary Examiner.*

JOHNNIE R. BROWN, *Assistant Examiner.*